No. 658,733. Patented Sept. 25, 1900.
C. J. COLEMAN.
SECONDARY BATTERY.
(Application filed Dec. 8, 1899.)
(No Model.)
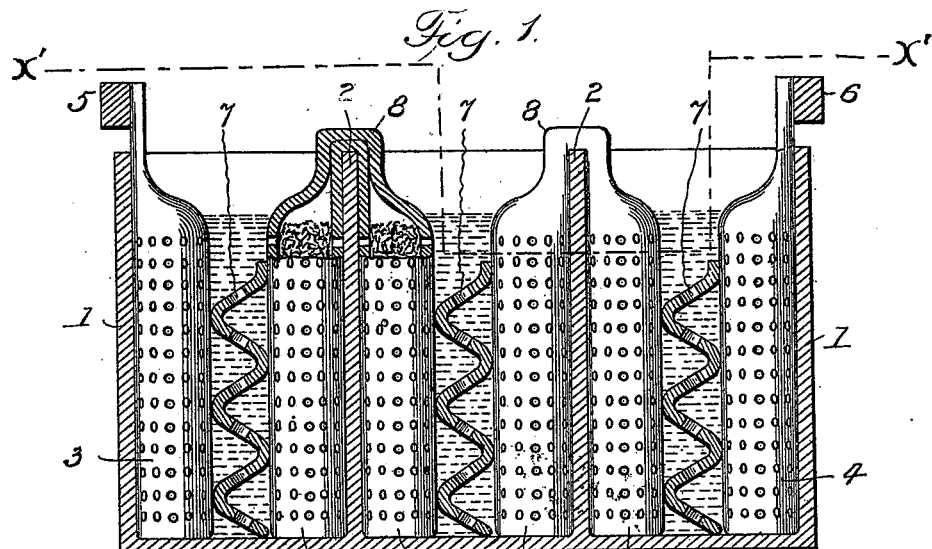
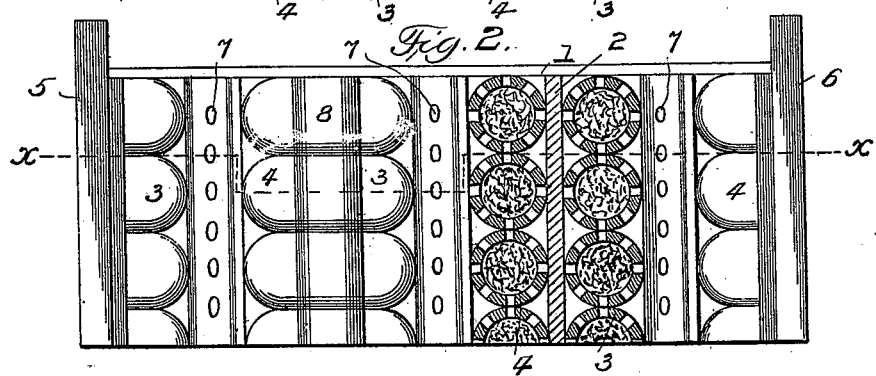
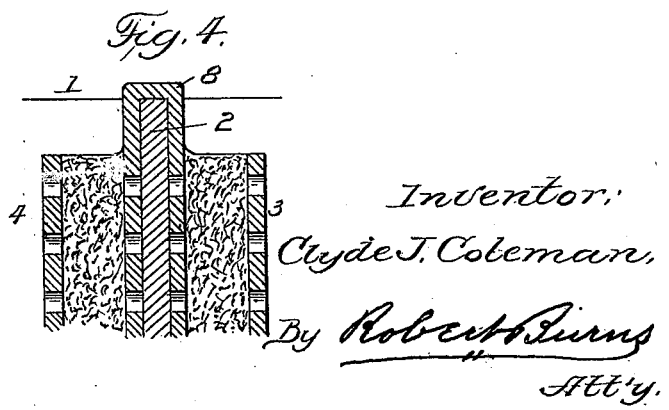
Witnesses:
John Enders
H. A. Nott
Inventor:
Clyde J. Coleman,
By Robert Burns
Att'y.

UNITED STATES PATENT OFFICE.

CLYDE J. COLEMAN, OF CHICAGO, ILLINOIS, ASSIGNOR, BY MESNE ASSIGN-MENTS, TO THE GENERAL ELECTRIC STORAGE BATTERY COMPANY, OF NEW JERSEY.

SECONDARY BATTERY.

SPECIFICATION forming part of Letters Patent No. 658,733, dated September 25, 1900.

Application filed December 8, 1899. Serial No. 739,726. (No model.)

*To all whom it may concern:*

Be it known that I, CLYDE J. COLEMAN, a citizen of the United States, and a resident of Chicago, in the county of Cook and State of Illinois, have invented certain new and useful Improvements in Secondary Batteries; and I do hereby declare the following to be a full, clear, and exact description of the same, reference being had to the accompanying drawings, forming a part of this specification.

This invention relates to that class of secondary batteries in which the active material is contained within a perforated inclosing casing, and more especially to that type of such batteries in which the positive and negative electrodes of adjoining cells are integrally connected together.

The object of the present invention is to provide a simple and efficient integral construction of secondary-battery electrodes in which the usual fusing or soldering of adjacent electrodes is avoided and a very durable and efficient connection of such electrodes is afforded, all as will hereinafter more fully appear and be more particularly pointed out in the claims. I attain such object by the construction and arrangement of parts illustrated in the accompanying drawings, in which—

Figure 1 is a sectional elevation at line $xx$, Fig. 2, of a series of secondary-battery cells embodying the present invention, a portion of one of the electrodes being shown in section; Fig. 2, a plan view of the same, partly in section at line $x'x'$, Fig. 1; Fig. 3, a side elevation of an electrode in an intermediate stage of manufacture; Fig. 4, a detail section of a modification.

Similar numerals of reference indicate like parts in the several views.

Referring to the drawings, 1 represents the battery-casing subdivided, as usual, by vertical partitions 2 into a series of cells, in which are arranged the series of positive and negative electrodes 3 and 4, the respective outer ones of which are in the present improvement provided with terminal connecting-strips 5 and 6, as shown.

The first feature of novelty in the present improvement involves the formation of each electrode of a series of perforated conducting-casings, in which are contained the filling of active material, and which series of casings are preferably of a cylindrical form and are arranged side by side in close rotation or stacked together to mutually support each other within the battery-cell in a manner clearly indicated in Fig. 2 of the drawings.

7 is an elastic cushion arranged between each pair of opposed positive and negative electrodes and preferably formed of a corrugated and perforated sheet of hard rubber or other like material, the construction and arrangement being such that such cushion 7 will hold the series of cylindrical casings composing the respective electrodes firmly against the walls of the battery-casing in proper separated relation during continued use.

The second feature of novelty in the present improvement involves a construction in which the positive electrode of one cell is individually connected to the next adjacent negative electrode of the next adjoining and intermediate cell of the battery. In the present improvement such purpose is attained by forming each pair of the series of perforated conducting-casings comprising such electrodes of a single continuous or integral section of tubing of sufficient length, with its middle portion flattened, as shown in Fig. 3, so as to enable the ready formation of the same into a supporting-saddle 8, that is adapted to straddle and rest upon the partition 2 of the battery-casing to support in a very perfect manner the respective sections in the respective cells of the battery, as illustrated in Fig. 1.

In some cases a portion of the central flattened portions of such casings may be cut away to leave a single thickness of metal in the formation of the supporting-saddle, as illustrated in Fig. 4, while in other cases the saddle may be formed separately and subsequently united to the respective cylindrical casings composing the respective electrodes.

Having thus fully described my said invention, what I claim as new, and desire to secure by Letters Patent, is—

1. A secondary battery comprising in combination, a partitioned battery-casing, positive and negative electrodes arranged therein, each of said electrodes comprising a series of perforated cylindrical conducting-casings filled with active material and arranged side by side in close relation to mutually support each other, the positive series of such casings being integrally and individually connected by saddle connections with the negative series of such casings, substantially as set forth.

2. A secondary battery comprising in combination a partitioned battery-casing, positive and negative electrodes arranged therein, each of said electrodes comprising a series of perforated cylindrical conducting-casings filled with active material and arranged side by side in close relation to mutually support each other, and an elastic cushion formed by a perforated and corrugated sheet of rubber or like material arranged between the opposed series of such casings, substantially as set forth.

3. A combined positive and negative electrode for secondary batteries, comprising a pair of perforated tubular conducting-casings containing the active material and united together by a connecting saddle portion integral with said casings and constituting a support for the electrodes within the battery-casing, substantially as set forth.

4. A combined positive and negative electrode for secondary batteries, comprising a pair of perforated tubular conducting-casings containing the active material, and connected together by a flattened formation of the tubular casing to constitute a supporting-saddle for the electrodes within the battery-casing, substantially as set forth.

Signed by me at Washington, District of Columbia, this 5th day of December, 1899.

CLYDE J. COLEMAN.

Witnesses:
ROBERT BURNS,
M. H. HOLMES.